US008439263B2

(12) United States Patent
Clark et al.

(10) Patent No.: US 8,439,263 B2
(45) Date of Patent: May 14, 2013

(54) HANDHELD ELECTRONIC ARTICLE SURVEILLANCE (EAS) DEVICE DETECTOR/DEACTIVATOR WITH INTEGRATED DATA CAPTURE SYSTEM

(75) Inventors: John Jay Clark, Boynton Beach, FL (US); David Buchanan Fallin, Coral Springs, FL (US); Scott Alan Tribbey, Coconut Creek, FL (US); Joseph P. Cossette, Fort Lauderdale, FL (US)

(73) Assignee: Tyco Fire & Security Services GmbH, Neuhausen am Rheinfall (CH)

( * ) Notice: Subject to any disclaimer, the term of this patent is extended or adjusted under 35 U.S.C. 154(b) by 386 days.

(21) Appl. No.: 11/884,641

(22) PCT Filed: Feb. 21, 2006

(86) PCT No.: PCT/US2006/006339

§ 371 (c)(1), (2), (4) Date: Sep. 2, 2008

(87) PCT Pub. No.: WO2006/089304

PCT Pub. Date: Aug. 24, 2006

(65) Prior Publication Data

US 2009/0090780 A1 Apr. 9, 2009

Related U.S. Application Data

(60) Provisional application No. 60/654,095, filed on Feb. 18, 2005.

(51) Int. Cl.
*G06K 7/10* (2006.01)
*G08B 13/14* (2006.01)

(52) U.S. Cl.
USPC ............ 235/462.01; 235/462.45; 235/472.01; 235/472.02; 340/572.1; 340/572.3

(58) Field of Classification Search ............ 235/462.01, 235/462.45, 472.01, 472.02; 340/572.1–572.9
See application file for complete search history.

(56) References Cited

U.S. PATENT DOCUMENTS 5,602,377 A * 2/1997 Beller et al. ............ 235/462.15
5,748,085 A 5/1998 Davis et al.

(Continued)

FOREIGN PATENT DOCUMENTS

WO WO 03/088168 * 10/2003
WO 2004023417 A2 3/2004

OTHER PUBLICATIONS

International Search Report and Written Opinion dated Jan. 5, 2007 for International Application No. PCT/US2006/006339, International Filing Date: Feb. 21, 2006 consisting of 12-pages.

*Primary Examiner* — Michael G Lee
*Assistant Examiner* — Laura Gudorf
(74) *Attorney, Agent, or Firm* — Alan M. Weisberg; Christopher & Weisberg, P.A.

(57) ABSTRACT

A portable, cordless hand-held device for locating an active electronic article surveillance (EAS) device, managing the activation/deactivation status of the EAS device and logging information relating to alarm events triggered by the EAS device. The device includes an EAS detector for detecting the presence of an EAS tag or label, a state manipulator for manipulating the activation/deactivation state of the detected active EAS label, at least one data capture device for capturing data related to the alarm event, and a memory for storage of the captured data.

22 Claims, 7 Drawing Sheets

U.S. PATENT DOCUMENTS

| | | | | |
|---|---|---|---|---|
| 5,955,951 | A | 9/1999 | Wischerop et al. | |
| 6,102,290 | A | 8/2000 | Swartz et al. | |
| 6,232,870 | B1 * | 5/2001 | Garber et al. | 340/10.1 |
| 6,286,762 | B1 * | 9/2001 | Reynolds et al. | 235/472.01 |
| 6,362,738 | B1 | 3/2002 | Vega | |
| 7,380,711 | B2 * | 6/2008 | Simon et al. | 235/383 |
| 2003/0234288 | A1 * | 12/2003 | Canipe et al. | 235/383 |
| 2004/0069851 | A1 * | 4/2004 | Grunes et al. | 235/435 |
| 2006/0072787 | A1 * | 4/2006 | Claudatos et al. | 382/103 |
| 2006/0187042 | A1 * | 8/2006 | Romer et al. | 340/572.1 |

* cited by examiner

HANDHELD ELECTRONIC ARTICLE SURVEILLANCE (EAS) DEVICE DETECTOR/DEACTIVATOR WITH INTEGRATED DATA CAPTURE SYSTEM

CROSS REFERENCE TO RELATED APPLICATIONS

The present application is a U.S. National Stage Application of PCT Application Number: PCT/US2006/006339, filed Feb. 21, 2006 entitled "HANDHELD ELECTRONIC ARTICLE SURVEILLANCE (EAS) DEVICE DETECTOR/DEACTIVATOR WITH INTEGRATED DATA CAPTURE SYSTEM," which relates to and claims priority from U.S. Provisional Patent Application Ser. No. 60/654,095, filed Feb. 18, 2005, entitled "Mobile Alarm Management With Integrated EAS Tag Detection, Deactivation and Capture," the entire disclosure of which is hereby incorporated by reference herein.

FIELD OF THE INVENTION

This invention relates generally to a handheld portable device for detection and deactivation of electronic article surveillance (EAS) devices, and more particularly to a handheld EAS deactivation device having an integral data capture and alarm event logging system.

BACKGROUND OF THE INVENTION

Conventional methods of logging Electronic Article Surveillance (EAS) device alarms rely on manual recordation (e.g., a paper log) or electronic recordation (e.g., a logging terminal) near the point of detection (e.g. a doorway of a store). EAS devices are typically a tag or label attached to or otherwise disposed in merchandise to be monitored. When an EAS alarm occurs, the responding employee must approach the customer, locate the EAS device causing the alarm, deactivate the EAS device, and log the cause of the alarm. In most cases, the customer has several bags of items, which makes it difficult to locate the item with the EAS device causing the alarm.

The employee will direct the customer back to the EAS monitoring system and place each bag separately in the EAS monitoring system in order to locate the bag with the active EAS device. Once the bag containing the active EAS device is located, each item in the bag must be inspected to locate the offending EAS device. This second alarm of the same EAS device generates additional alarms that need to be logged. Once the EAS device attached to the item is located, it must be deactivated at a deactivation apparatus, which is usually located at the cash register. Finally, the employee must log the alarms and capture all associated alarm details. This process can be time consuming and inefficient. It also can unnecessarily delay the customer's exit from the store, resulting in customer satisfaction problems.

As noted above, some alarm logging systems have moved from paper logs to electronic logs. Typically, a store employee logs each alarm electronically using a stationary terminal located near the entrance or exit of the store. In one conventional example, a stand-alone, portable EAS device detection and deactivation apparatus is used. Such a system, however, only addresses the detection and deactivation portion of responding to an EAS alarm. Moreover, the process of EAS device detection, deactivation, and data capture associated with the process of the alarm logging is still inefficient and can be time consuming. There is a need, therefore, for a more efficient way to handle the detection, deactivation, and data capture associated with an EAS alarm.

SUMMARY OF THE INVENTION

The following simplified summary provides a basic overview of some aspects of the invention. This summary is not an extensive overview. It is not intended to identify key or critical elements or to delineate the scope of the invention. This Summary is not intended to be used as an aid in determining the scope of the claimed subject matter. Its purpose is to present some simplified concepts related to the technology before the more detailed description presented below.

Embodiments of the invention overcome one or more deficiencies in known EAS systems by employing a portable device for locating an activated device and managing the activation/deactivation status of the device. A portable, cordless hand-held device is disclosed for locating an active electronic article surveillance (EAS) device, managing the activation/deactivation status of the EAS device and logging information relating to alarm events triggered by the EAS device. The device includes an EAS detector for detecting the presence of an EAS tag or label, a state manipulator for manipulating the activation/deactivation state of the detected active EAS label, at least one data capture device for capturing data related to the alarm event, and a memory for storage of the captured data.

BRIEF DESCRIPTION OF THE DRAWINGS

For a better understanding of various embodiments of the invention, reference should be made to the following detailed description which should be read in conjunction with the following figures wherein like numerals represent like parts.

Corresponding reference characters indicate corresponding parts throughout the drawings.

DETAILED DESCRIPTION

Figure 1:
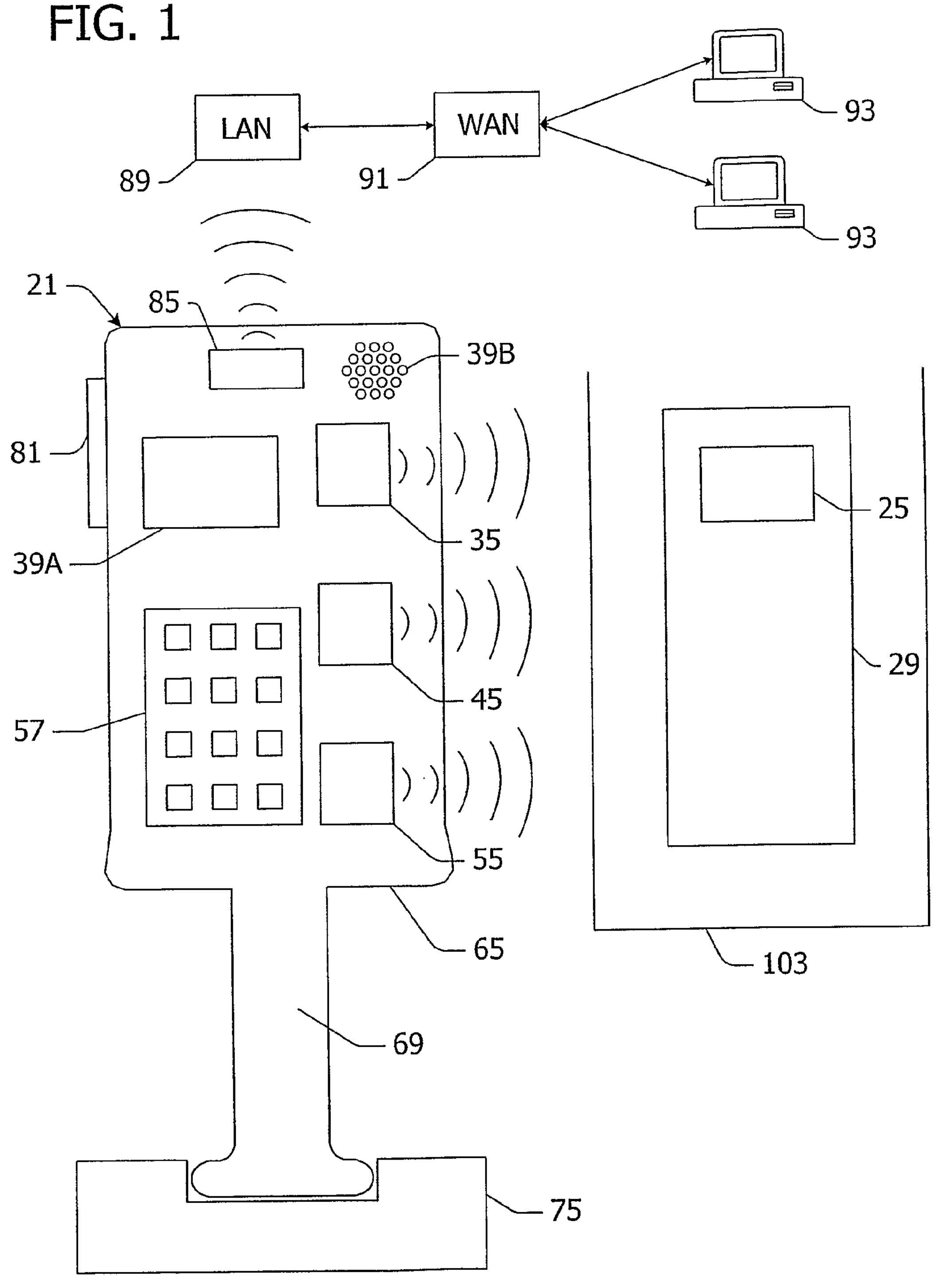
FIG. 1 is a schematic of a portable device for locating an active EAS device of the present invention.

For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation.

In the embodiment depicted in FIGS. 1-5, a portable device, generally indicated 21, for locating an active electronic article surveillance device (EAS) 25 and managing the activation/deactivation status of the EAS device is disclosed. As would be understood by one skilled in the art, EAS devices 25 typically exist in one or two states, active and inactive. EAS devices 25 placed on items 29 in stores are typically set to an active state, so that the EAS device can function as an indicator that the item has not been purchased, triggering an alarm when detected, such as at the exit of a store. In contrast, an EAS device 25 associated with a purchased item 29 may be deactivated, such as at the retail checkout, so that the item will not cause an alarm. As would be readily understood by one skilled in the art, the management of the active or inactive status of such EAS devices 25 is an important, and potentially time-consuming, part of retailing. EAS devices 25 are also readily applicable to other inventory systems, such as warehousing.

To aid in the management of such EAS devices 25, the portable device 21 comprises a detector 35 for detecting the presence of an active EAS device (see FIG. 1). Such a detector 35 is useful in a typical retail setting, for example, when the occurrence of an EAS alarm at a store exit triggers an employee to approach a customer with the portable device 21 to facilitate deactivation of the EAS device 25 and exit from the store. The detector 35 allows the employee to quickly scan the items 29 purchased by the customer at the store exit, rather than the checkout counter. By scanning the purchased items 29, the employee can readily determine which of the items still includes an active EAS device 25, rather than attempting to deactivate each item likely to include an EAS device.

In one embodiment, for example, the detector 35 may be an RFID label detector for detecting the active EAS device 25 in the form of an RFID label within a working range of the detector. The detector 25 can also be an acoustomagnetic or electromagnetic tag detector. With the detector 35, the active EAS device 25 can be readily detected in a group of items or through a container, such as a gift box or shopping bag, or through clothing, such as under a coat. Those skilled in the art are familiar with detection of EAS devices 25 by passing the EAS device near an EAS detector (e.g., a detection pedestal), usually located at the entrance and exit of a store, or using a handheld EAS detection device. As such, the operation of such devices will not be elaborated upon here.

Figure 2:
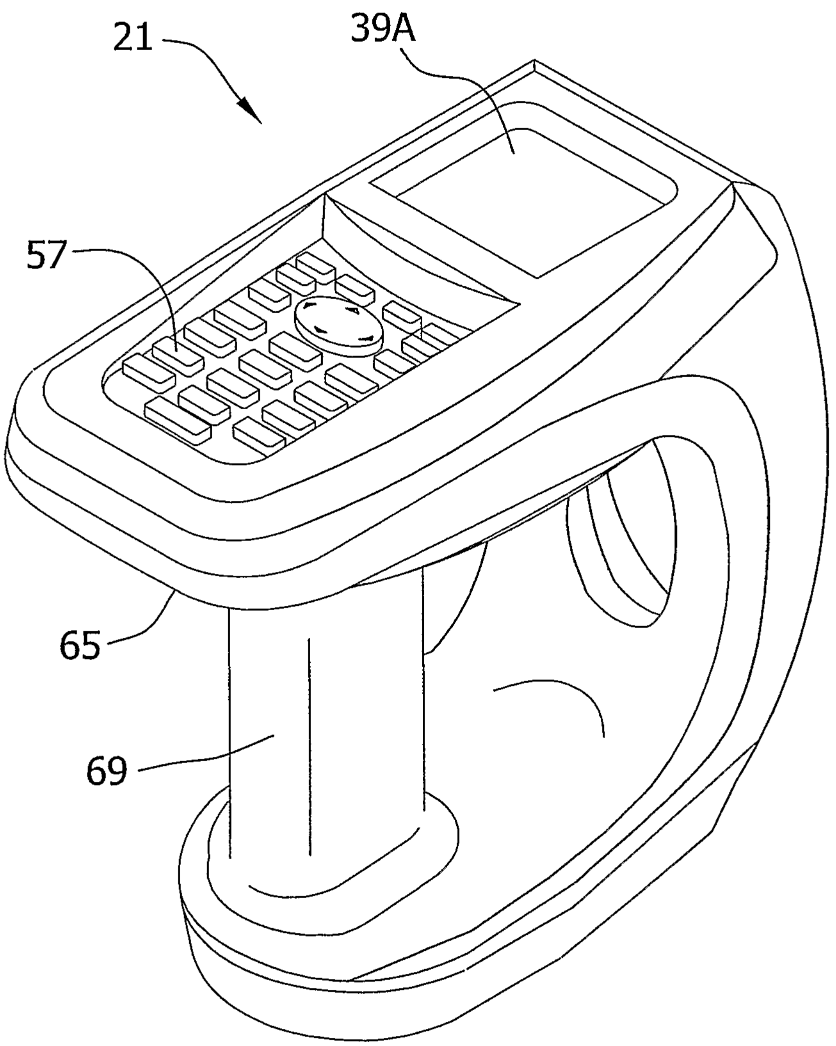
FIG. 2 is a perspective of a portable device of FIG. 1.
Figure 3:
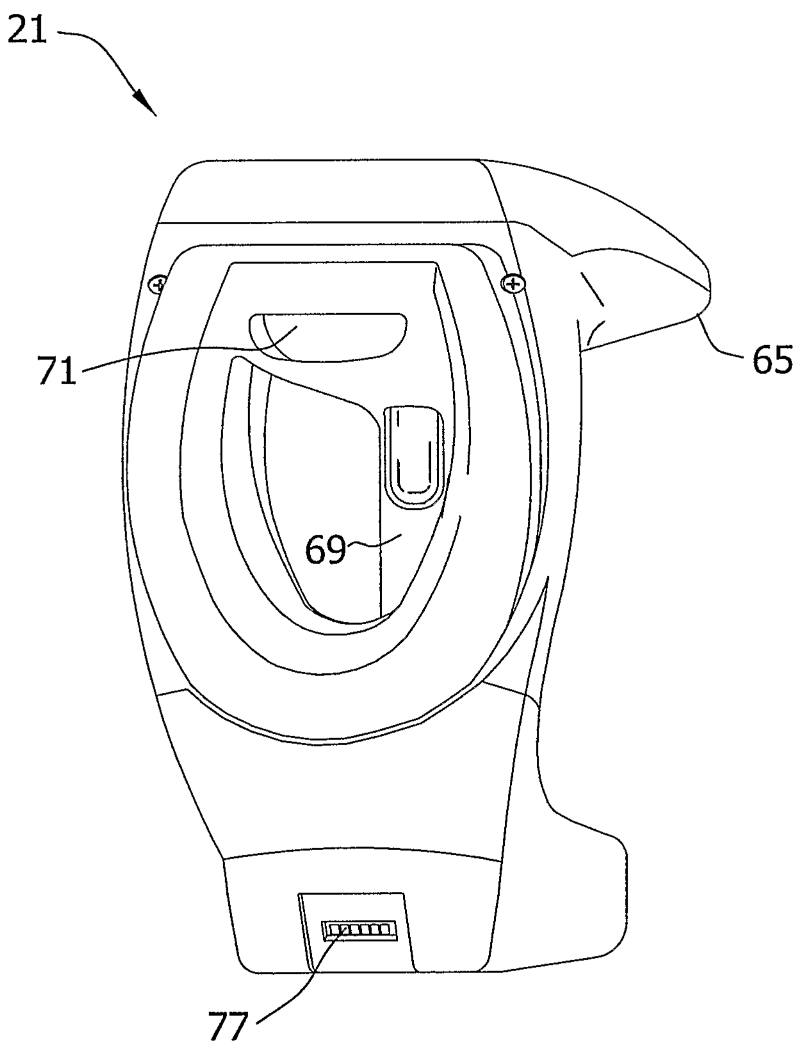
FIG. 3 is a front view of the portable device of FIG. 2.
Figure 4:
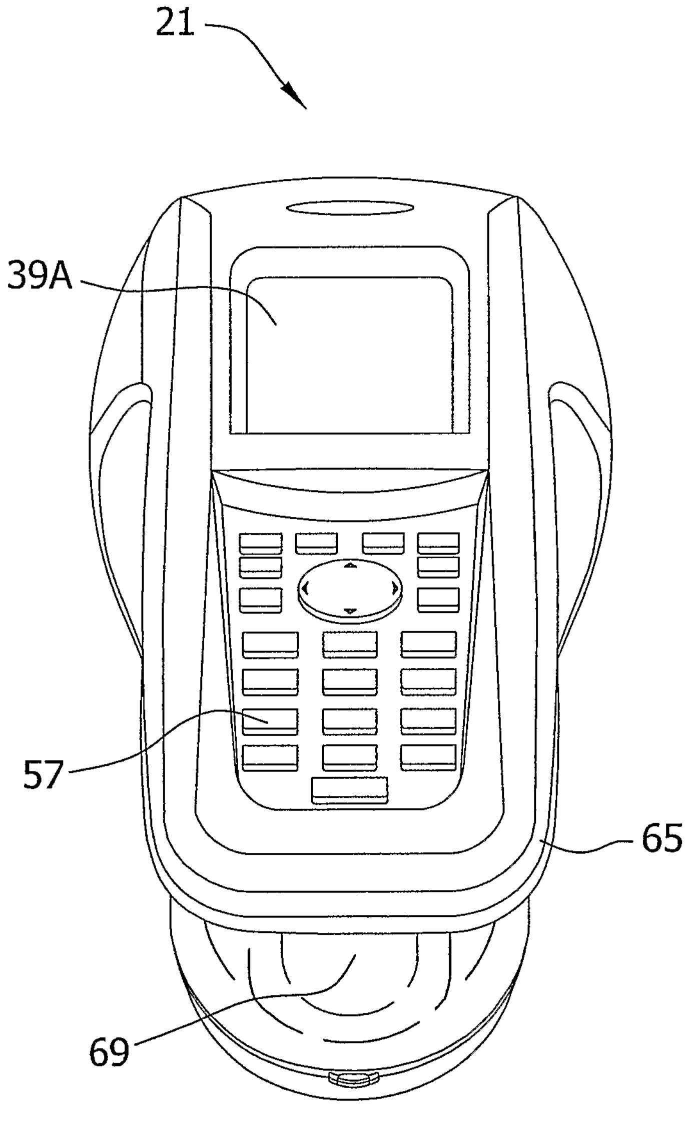
FIG. 4 is a top view of the portable device of FIG. 2.

Referring to FIGS. 1, 2, and 4, the portable device 21 may further comprise a detection indicator 39 for indicating detection of the active EAS device 25. In one example, the detection indicator 39 comprises at least one of a visual indicator (e.g., a written message on a display 39A) and an audible indicator (e.g., an audible sound from a speaker 39B) for indicating detection of the active EAS device. In a warehousing example, the portable device 21 may be utilized to determine if each item 29 is tagged with an active EAS device 25 before shipping the item 29 or placing the item on a store shelf. In a retail example, the detection indicator 39 can alert the user while the user scans several items 29 at once, so that the user need not pause between each item scanned to verify if an active EAS device 25 is or is not detected.

According to aspects of the invention, the portable device 21 may also include a state manipulator 45 for manipulating the activation/deactivation state of the detected active EAS device 25 (see FIG. 1). As noted above EAS devices 25 typically exist in one or two states, active and inactive. The state manipulator 45 is capable of changing the state of the detected EAS device 25. In one example, the state manipulator 45 is a deactivator for deactivating the detected, active EAS device 25.

In another embodiment, the state manipulator 45 may be both a deactivator and an activator. With this alternative embodiment, the state of the EAS device 25 may be manipulated from active to inactive or from inactive to active. The ability to manipulate the state from inactive to active may be particularly useful in the warehousing example, where an inactive EAS device 25 on an item 29 requires activation before shipping and/or sale of the item. Those skilled in the art are familiar with activation and deactivation of EAS devices 25 by using a passive contact deactivation device or an electronic deactivator device, for example, as well as other devices not called out specifically here. As such, the operation of such devices will not be elaborated upon here.

The portable device 21 may also include at least one data capture device 55 for capturing data related to the detected EAS device 25 (see FIG. 1). The data capture device 55 may capture at least one of (i) the time of the detection of the active EAS device 25, (ii) the location (e.g., in a store or warehouse) where the detector 35 detected the active EAS device, (iii) an identifier associated with the active EAS device, (iv) an identifier associated with the item 29 associated with the detected active EAS device (e.g., a product Uniform Product Code (UPC)), (v) an identifier associated with a list containing the item (e.g., a receipt barcode), (vi) an identifier identifying the reason for the active state of the EAS device, and (vii) an identifier associated with a point of sale transaction. Other types of data may also be captured without departing from the scope of the invention.

The data capture device 55 may take various forms, including but not limited to, at least one of a manual data entry device, a barcode scanner, and a radio frequency identification (RFID) tag reader. For example, the barcode scanner may capture an SKU (Stock Keeping Unit) code associated with the scanned item. In another example, the RFID tag reader may capture the data associated with an RFID tag. In the case of a manual data entry device, several devices are contemplated as within the scope of the present invention, including a keypad, a button or group of buttons, a touch screen, a joystick, and a stylus. Other devices may also be used without departing from the scope of the invention. In the embodiment of FIGS. 1-4, a keypad 57 may be included for manual data entry. Any manual data entry device may be used without departing from the scope of the invention. Other data capture devices may automatically capture the data, rather than requiring manual data entry. For example, once the detector 35 detects an active EAS device 25, an RFID tag reader of the portable device 21 may automatically gather the data from an RFID tag associated with the item 29.

Figure 5:
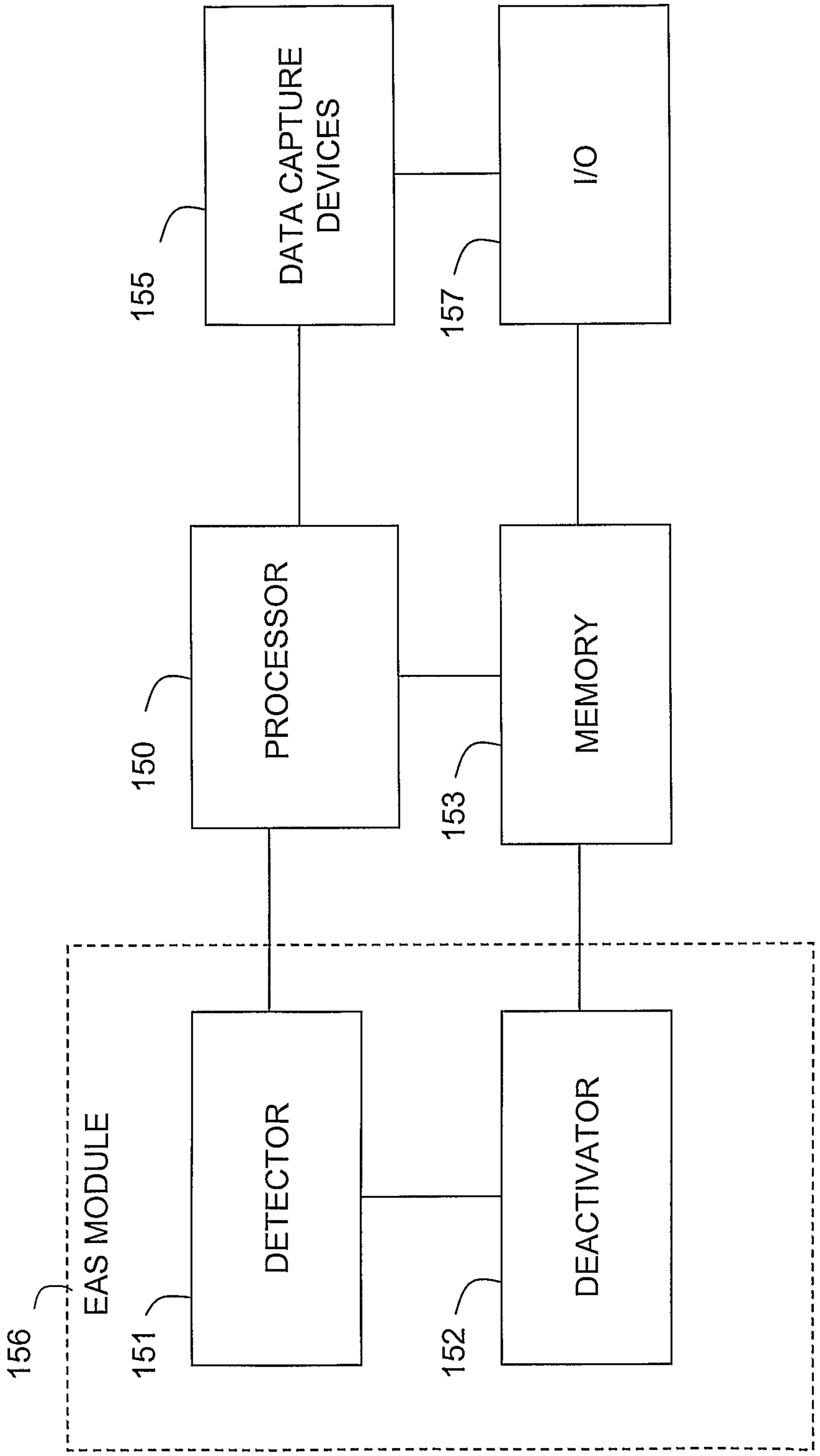
FIG. 5 is a schematic illustration of components of one embodiment of the portable device of FIG. 1.

FIG. 5 schematically illustrates one embodiment of the components of the portable device 21. The device 21 may include a processor 150 coupled to a memory means 153. The processor 150 can have an embedded operating system such a Microsoft Windows CE or the like. The device 21 may include an EAS module 156 which can be selected and configured for operation in a specific type of EAS system. The EAS module 156 can include a detector 151 for detecting the presence of an active EAS device. As is known in the art, the detector 151 can include, for example, a transmitter for transmitting an interrogation signal and a receiver for detection of an alarm pattern. The EAS module may include a state manipulator such as the deactivator 152 which is operable to bring an active EAS device to an inactive state. The deactivator 152 can be either a contact deactivator or a proximity deactivator, for example, although the invention is no limited in this regard. In embodiments where reusable EAS labels are utilized, the state manipulator could also be a combination EAS device activator/deactivator.

As described above, the portable device 21 may include at least one integral data capture device 155. The data capture device 155 can be used to collect data relevant to an alarm event triggered by an EAS device. The collected data may be stored in the memory 153 to provide an electronic alarm event log.

The portable device 21 can include any suitable I/O data transmission means 157 which can transfer the logged alarm event data to a central server. In a first mode of use, the data is stored in the memory 153 and periodically downloaded to the server. In a second mode of use, the data can be transmitted in real time to a remote server. In the practice of the invention, the data can be stored in the memory 153 of the device 21 and transmitted to the remote server simultaneously as well.

For example, the data transmission can be effected by direct electronic coupling of the device 21 to the destination server using any suitable conventional communication link including, but not limited to, telephone lines, IEEE 1284 (parallel port), Ethernet, universal serial bus port such as USB and USB 2.0, IEEE 1394 (Firewire), IrDA standard (InfraRed Data Association), fiber optics etc. Conventional port and cable connector arrangements can be used to establish a communications link between the device 21 and the destination device. The invention can also include a docking port for the device 21 which is configured to initiate a communications link upon engagement. The device 21 may also include a removable flash memory card having the data stored thereon which can be physically transferred to another device. The data can also be transmitted to a LAN using wireless data transmission means, as is described in detail hereinafter Referring again to FIGS. 1-5, the portable device 21 may further comprise a portable housing 65. The detector 35, the state manipulator 45, and the data capture device 55 may each be mounted on the portable housing 65. In one example, the portable housing 65 of the device 21 may be shaped and sized to be hand-held by a user, such as with the handle 69 depicted in FIGS. 1-4. In still another example, the portable device 21 may be shaped and sized to be hand-held with one hand only, so that the user's other hand may be utilized to manipulate items 29 or perform other related (e.g., using the keypad 57) tasks. The portable housing 65 may take virtually any configuration without departing from the scope of the invention. The housing 65 may also includes a window 71 (see FIG. 3) for improving transmission of signals past the housing, while protecting the internal components of the portable device 21.

The portable device 21 is preferably cordless and may further comprise a base 75 (see FIG. 1). The portable housing 65 may be releasably attachable to the base 75 for storing the housing when not in use. The base 75 may also act as a charger for any internal battery of the portable device or as a connection point between the portable device and a network (discussed below), such as for batch data downloading from the portable device 21 to the network. The portable device 21 communicates with the base 75 via a connector 77 mounted on the housing 65 (see FIG. 3). The portable device 21 may further comprise an authentification system 81 for releasing the housing 65 from the base 75 upon valid user authentification by a user and for securing the housing to the base with an invalid user authentification. The authentification system 81 may take virtually any form, including but not limited to, at least one of a swipe badge card system, a proximity badge card system, and a password protected system.

The portable device 21 may further include a network access provider 85 for providing communication between the portable device and a network 89 (e.g., a local area network (LAN)) for sending data to the network and receiving data from the network (see FIG. 1). The LAN 89 may be further connected to a wide area network 91 (WAN) for further communication of data to client computers 93 accessing the WAN. In the example depicted in FIG. 1, the network access provider 85 may be a wireless network access provider. With the wireless network access provider 85, the data captured by the data capture device 55 may be transferred wirelessly with virtually any wireless technology, including but not limited to WiFi (e.g., 802.11b, 802.11a, and 802.11g), Bluetooth, GSM (Global System for Mobile communications), GPRS (General Packet Radio Service), 2.5G (enhanced GSM), 3G (third generation mobile phone technologies), as well as other technologies. With the wireless network access provider 85, the portable device 21 may connect directly with a retailer's in-store, wired or wireless network (e.g., LAN) for real-time communication and decision making. In the retailing example, the wireless networking allows the portable device 21 to be used virtually anywhere in the user's store to speed up BAS alarm handling at exits, move customers more quickly during purchasing, replace inefficient and inaccurate paper logging, and provide data for evaluating and improving retail operations.

Figure 6:
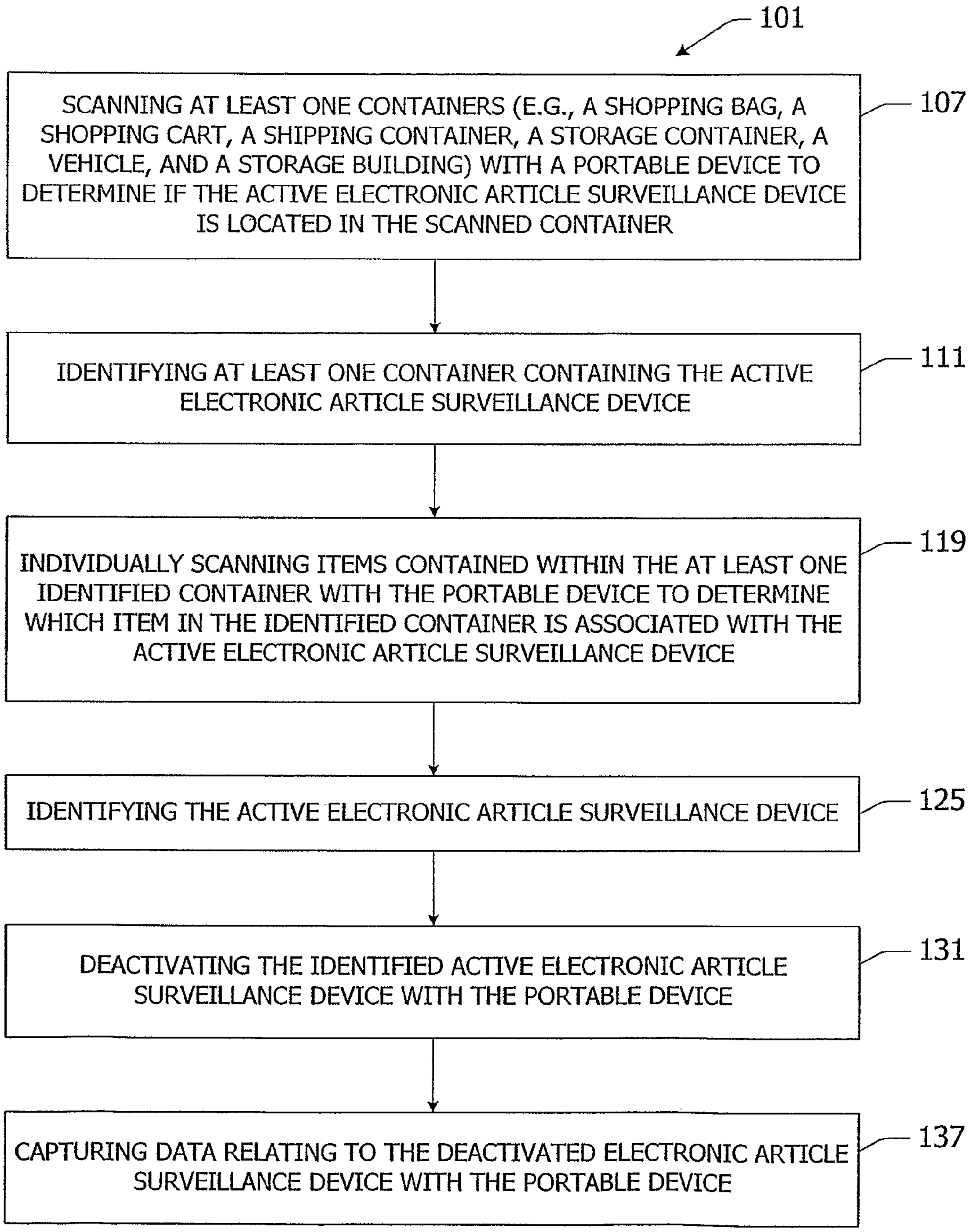
FIG. 6 is a flowchart of a method of the invention.
Figure 7:
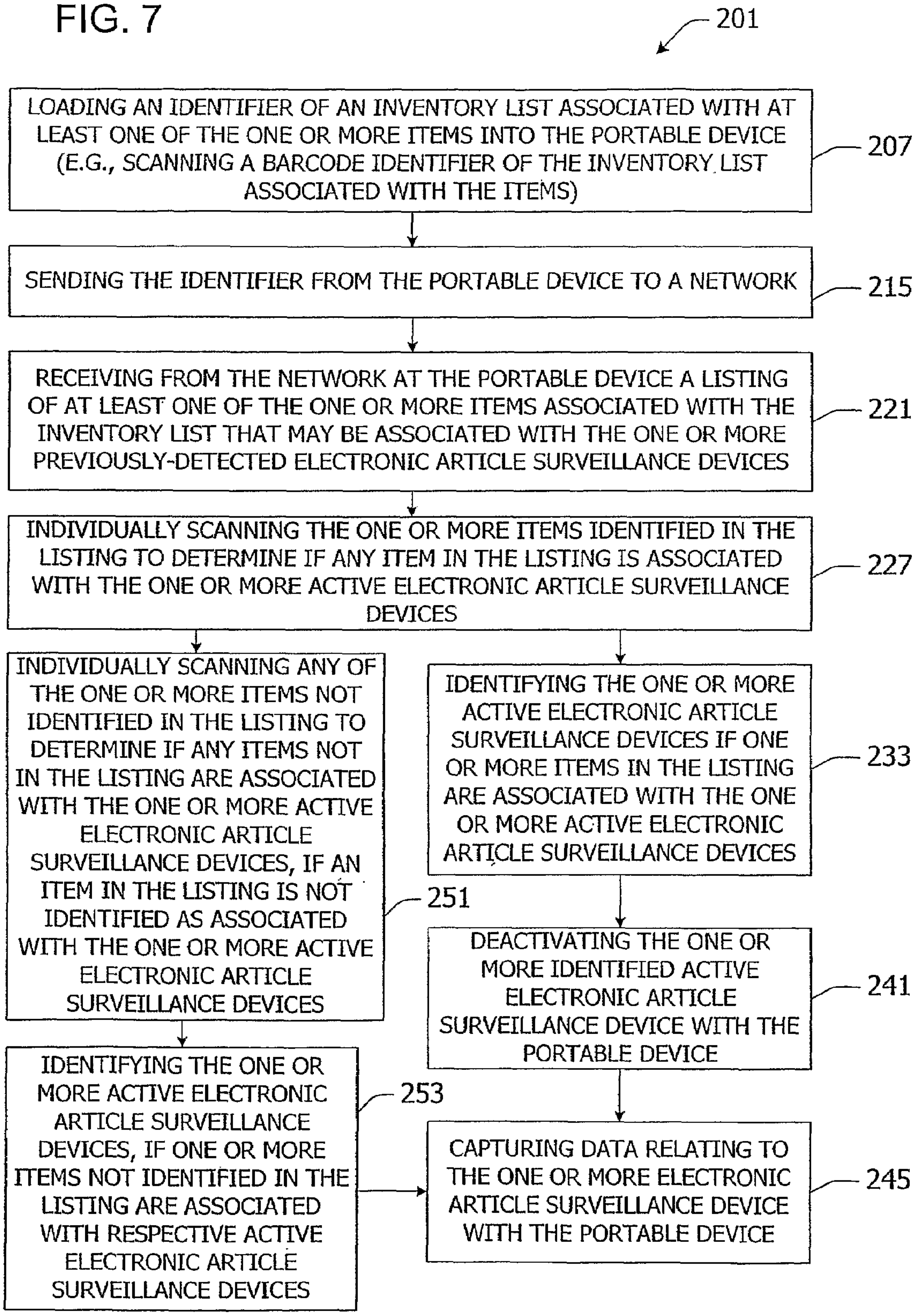
FIG. 7 is a flowchart of another method of the invention.

Another embodiment of the invention depicted in FIG. 6 comprises a method, generally indicated 101, for identifying and deactivating a previously-detected active EAS device 25 located within one or more containers 103 of items 29 (see FIG. 1) with a portable device 21. The method includes the steps of scanning, at 107, at least one of the containers 103 with a portable device 21 to determine if the active EAS device 25 is located in the scanned container. The method can further include identifying, at 111, at least one container 103 containing the active EAS device 25. The scanning 107 of at least one of the containers 103 to identify 111 the container with the active EAS device 25 comprises scanning at least one of a shopping bag, a shopping cart, a shipping container, a storage container, a vehicle, and a storage building. Other containers 107 not listed here are also contemplated as within the scope of the present invention. In one example in the retailing arena, an employee can immediately use the portable device 21 to scan 107 the customer's bags 103 to quickly identify the bag that contains the item(s) 29 causing the alarm. If the scanning 107 of the containers 103 does not yield the location of the active EAS device 25, the personal effects of the customer, such as a purse, handbag, pockets, or coat may also be scanned by security personnel to determine if the active EAS device is located in another location. More generally, security personnel may use the portable device 21 to scan any number of items to determine the location of the active EAS device 25, such as for identifying a piece of misplaced or stolen merchandise.

The method may further include the step of individually scanning, at 119, items 29 contained within the at least one identified container 103 with the portable device 21 to determine which item in the identified container is associated with the active EAS device 25. The method can further include identifying, at 125, the active EAS device 25. In the retailing example, the employee individually scans 119 the items 29 in the customer's bags 103 until the active EAS device 25 is identified 125. The method further includes deactivating, at 131, the identified active EAS device 25 with the portable device 21. The method can further include the step of capturing, at 137, data relating to the deactivated EAS device 25 with the portable device 21. Once captured 137, the data may be sent to the network 89, 91 in real-time (as the data is collected) or as a batch (e.g., when the portable device 21 is connected to the base 75).

In still another embodiment of the present invention depicted in FIG. 6, a method, generally indicated 201, for identifying one or more previously-detected active EAS devices 25 associated with one or more respective items (e.g., within one or more containers 103) with a portable device 21 is disclosed. The method 201 includes the step of loading, at 207, an identifier of an inventory list associated with at least one of the one or more items 29 into the portable device 21. In one example, the loading 207 an identifier of an inventory list includes the step of scanning, also at 207, a barcode identifier of the inventory list associated with the items 29. In the retailing example, this loading 207, or scanning, may be the scanning of a barcode associated with a receipt for a list of purchased items 29.

The method can further include the steps of sending, at 215, the identifier from the portable device 21 to a network (e.g., the LAN 89) and receiving, at 221, from the network at the portable device a listing of the at least one of the one or more items 29 associated with the inventory list that may be associated with the one or more previously-detected EAS devices 25. Returning to the retailing example, the listing of the at least one of the one or more items 29 may be a list of the items purchased by the customer that may have an EAS device 25 associated with them, so that the employee can focus their efforts on the items most likely to have an active EAS device. To wit, the method further includes the steps of (i) individually scanning, at 227, the one or more items 29 identified in the listing to determine if any item in the listing is associated with the one or more active EAS devices and (ii) identifying, at 233, the one or more active EAS devices if one or more items in the listing are associated with the one or more active LAS device.

The method further includes the steps of individually scanning, at 251, any of the one or more items 29 not identified in the listing to determine if any items not in the listing are associated with the one or more active EAS devices, if an item in the listing is not identified as associated with the one or more active EAS devices. In other words, if scanning the items 29 in the listing does not identify the item associated with the active EAS device, security personnel can scan the other items under the control of the customer, but not included in the listing. This additional scan can identify items not scanned by the cashier either by accident, or due to "sweethearting," the practice of cashier-facilitated stealing by a customer by not charging the customer for one or more items. Moreover, the security personnel may then identify, at 253, the one or more active EAS devices, if one or more items not identified in the listing are associated with respective active EAS devices. This enables the security employee to identify the particular item 29 that was not purchased, whereby the customer may purchase the item. The method further comprises capturing, at 245, data relating to the one or more identified EAS devices with the portable device. This can include any number data, including the identity of the item not scanned, the cashier who failed to scan the item, and the store where the failure to scan occurred, among others. By tracking such data over time, the root cause, or causes, of inventory loss due to failure to scan items may be identified and addressed.

The method may further include deactivating, at 241, the one or more identified active EAS devices 25 with the portable device 21 and capturing, at 245, data relating to the one or more deactivated EAS devices with the portable device. In the retailing example noted above, the deactivating 241 deactivates the active tag so the customer can exit the store without an alarm, and the capturing 245 captures data relating to the item 29, the customer, or any other aspect of the method.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

It is to be understood that variations and modifications of the various embodiments of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A portable device for managing an activation/deactivation status of an electronic article surveillance (EAS) device affixed to an item, the EAS device including a radio frequency identification tag, and for logging information relating to alarm events triggered by the EAS device, said portable device comprising:

a detector, the detector being configured to detect the presence of an active electronic article surveillance device;

a state manipulator, the state manipulator being configured to manipulate the activation/deactivation state of the active electronic article surveillance device;

a radio frequency identification tag reader, the radio frequency identification tag reader being configured to capture data from the radio frequency identification tag associated with the active electronic article surveillance device to identify the item associated with the captured data;

a data capture device, the data capture device being configured to capture additional data associated with the active electronic article surveillance device; and a memory, the memory being configured to store an electronic alarm event log associated with the active electronic article surveillance device, the electronic alarm event log being based at least in part on the captured data and the captured additional data.

2. A portable device as set forth in claim 1 wherein the data capture device is one of a manual data entry device and a barcode scanner.

3. A portable device as set forth in claim 2 wherein the manual data entry device comprises at least one of a keypad, a button or group of buttons, a touch screen, a joystick and a stylus.

4. A portable device as set forth in claim 1 wherein the state manipulator is further configured to deactivate the active electronic article surveillance device, the additional data being captured after the deactivation.

5. A portable device as set forth in claim 4 wherein the portable device is shaped and sized to be hand-held by a user.

6. A portable device as set forth in claim 1 further comprising a detection indicator for indicating detection of the active electronic article surveillance device.

7. A portable device as set forth in claim 6 wherein the detection indicator comprises at least one of a visual indicator and an audible indicator for indicating detection of the active electronic article surveillance device.

8. A portable device as set forth in claim 1 wherein the radio frequency identification tag reader automatically captures the data from the radio frequency identification tag associated with the active electronic article surveillance device after the presence of the active electronic article surveillance device is detected.

9. A portable device as set forth in claim 1 wherein at least one of the RFID reader and the data capture device is further configured to capture at least one of a time of the detection of the active electronic article surveillance device, a location where the detector detected the active electronic article surveillance device, an identifier associated with the active electronic article surveillance device, an identifier associated with an item associated with the detected active electronic article surveillance device, an identifier associated with a list containing the item, an identifier identifying the reason for the active state of the electronic article surveillance device, and an identifier associated with a point of sale transaction.

10. The portable device as set forth in claim 2, wherein said barcode scanner is configured to capture data from a barcode printed on a retail register receipt.

11. The portable device as set forth in claim 10, wherein said barcode scanner is further configured to capture data from a barcode printed on the retail register receipt including at least one of an identifier associated with the active electronic article surveillance device, an identifier associated with an item associated with the detected active electronic article surveillance device, an identifier associated with a list containing the item, and an identifier associated with a point of sale transaction.

12. A portable device as set forth in claim 1 further comprising a network access provider, the network access provider being configured to transmit the electronic alarm event log to a server.

13. A portable device as set forth in claim 12 wherein the network access provider is a wireless network access provider.

14. A portable device as set forth in claim 4 further comprising a base;

a portable housing, the detector, state manipulator and data capture device being mounted on the housing, the housing being releasably attachable to the base for storing the housing when not in use; and an authentication system for releasing the housing from the base upon valid user authentication and for securing the housing to the base with invalid user authentication.

15. A portable device as set forth in claim 14 wherein the authentication system comprises at least one of a swipe badge card system, a proximity badge card system, and a password protected system.

16. A method for identifying and deactivating an active electronic article surveillance (EAS) device using a portable device, the active electronic article surveillance device having a radio frequency identification tag and being located within one or more containers, said method comprising:

scanning a plurality of electronic article surveillance devices affixed to items located within at least one of the containers using the portable device;

detecting the active electronic article surveillance device located within the at least one of the containers;

capturing data from the radio frequency identification tag associated with the active electronic article surveillance device contained within the at least one of the containers to identify the item associated with the captured data;

capturing additional data associated with the active electronic article surveillance device;

storing an electronic alarm event log associated with the active electronic article surveillance device, the electronic event log being based at least in part on the captured data from the radio frequency identification tag and the captured additional data;

identifying the active electronic article surveillance device associated with the identified item; and deactivating the identified active electronic article surveillance device with the portable device.

17. A method as set forth in claim 16 wherein said scanning at least one of the containers comprises scanning at least one of a shopping bag, a shopping cart, a shipping container, a storage container, a vehicle, and a storage building.

18. A method for identifying active electronic article surveillance (EAS) devices using a portable device and associating the active electronic article surveillance devices having a radio frequency identification tag with respective items upon detection of an alarm event, said method comprising:

loading an inventory list identifier corresponding to an item list of a plurality of items into the portable device;

transmitting the inventory list identifier from the portable device to a network;

receiving at the portable device the item list, the active electronic article surveillance devices corresponding to items on the item list;

scanning a plurality of electronic article surveillance devices associated with the plurality of items identified in the item list to identify active electronic article surveillance devices;

capturing data from the radio frequency identification tag associated with the active electronic article surveillance device contained within the scanned devices to identify the item associated with the captured data;

capturing additional data associated with the active electronic article surveillance device;

storing an electronic alarm event log associated with the active electronic article surveillance device at the portable device, the electronic event log being based at least in part on the captured data from the radio frequency identification tag and the captured additional data; and selecting items from the item list that correspond to the active electronic article surveillance devices.

19. A method as set forth in claim 18 further comprising deactivating the active electronic article surveillance devices with the portable device; and capturing data relating to the deactivated electronic article surveillance devices with the portable device after the deactivation.

20. A method as set forth in claim 18 wherein said loading the inventory list identifier comprises scanning a barcode identifier of the inventory list associated with the plurality of items.

21. The portable device as set forth in claim 18, wherein said loading the inventory list identifier comprises scanning a barcode printed on a retail register receipt using a barcode reader to capture data therefrom.

22. A method as set forth in claim 18 further comprising scanning items not identified in the item list to determine if the items not in the item list are associated with the active electronic article surveillance devices, if an item in the item list is not identified as associated with the active electronic article surveillance devices; and identifying the active electronic article surveillance devices, if the items not identified in the item list are associated with respective active electronic article surveillance devices.

* * * * *